United States Patent
Gauf et al.

(10) Patent No.: US 10,929,258 B1
(45) Date of Patent: Feb. 23, 2021

(54) METHOD AND SYSTEM FOR MODEL-BASED EVENT-DRIVEN ANOMALOUS BEHAVIOR DETECTION

(71) Applicant: Innovative Defense Technologies, LLC, Arlington, VA (US)

(72) Inventors: Bernard Gauf, Vienna, VA (US); Michael Bryman, Huntingdon Valley, PA (US); Claire Moore, Bethesda, MD (US); Samuel Nicoll, Oakton, VA (US); David Ponticello, Medford, NJ (US)

(73) Assignee: INNOVATIVE DEFENSE TECHNOLOGIES, LLC, Arlington, VA (US)

(*) Notice: Subject to any disclaimer, the term of this patent is extended or adjusted under 35 U.S.C. 154(b) by 60 days.

(21) Appl. No.: 16/230,047

(22) Filed: Dec. 21, 2018

Related U.S. Application Data

(60) Provisional application No. 62/608,844, filed on Dec. 21, 2017.

(51) Int. Cl.
| | |
|---|---|
| G06F 11/00 | (2006.01) |
| G06F 11/22 | (2006.01) |
| G06N 7/00 | (2006.01) |
| G06F 11/263 | (2006.01) |

(52) U.S. Cl.
CPC ........ *G06F 11/2257* (2013.01); *G06F 11/263* (2013.01); *G06N 7/005* (2013.01)

(58) Field of Classification Search
CPC ............................ G06F 11/2257; G06F 11/263
See application file for complete search history.

(56) References Cited

U.S. PATENT DOCUMENTS

| | | | | |
|---|---|---|---|---|
| 2016/0313651 | A1* | 10/2016 | Middlebrooks | G06F 30/367 |
| 2017/0063884 | A1* | 3/2017 | Seigel | H04L 63/1425 |
| 2017/0124311 | A1* | 5/2017 | Li | G10L 17/02 |
| 2017/0230391 | A1* | 8/2017 | Ferguson | G06N 5/022 |
| 2018/0190382 | A1* | 7/2018 | Ramezani | G06N 5/047 |

* cited by examiner

*Primary Examiner* — Katherine Lin

(74) *Attorney, Agent, or Firm* — Hunton Andrews Kurth LLP

(57) ABSTRACT

An embodiment of the present invention is directed to an optimal event-driven anomaly detection scheme. The present invention recognizes that anomaly detection based solely on rules-based (deterministic) or probabilistic analysis alone are insufficient to capture and respond to ever evolving, highly sophisticated threats that tend to persist within a system undetected for long periods of time. According to an embodiment of the present invention, a tiered detection scheme composed of behavioral analysis and machine-learned probabilistic system behaviors provides an optimal level of sensitivity to detect and respond to threats, and further limits the number of false positives identified.

16 Claims, 11 Drawing Sheets

METHOD AND SYSTEM FOR MODEL-BASED EVENT-DRIVEN ANOMALOUS BEHAVIOR DETECTION

CROSS REFERENCE TO RELATED APPLICATIONS

This application claims priority to U.S. Provisional Application 62/608,844, filed Dec. 21, 2017, the contents of which are incorporated herein in its entirety.

FIELD OF THE INVENTION

The present invention relates generally to anomalous behavior detection and more specifically to a method and system for model-based event-driven anomalous behavior detection.

BACKGROUND OF THE INVENTION

Computer systems have grown significantly more complex in recent years. This complexity creates significant risk in system operating performance in issues caused by poor design and development practices, as well as external factors influencing performance such as misbehaving adjacently connected systems and intentionally injected malicious threats, the latter of which is a problem that the present invention addresses. Moreover, system complexity also compounds the difficulty of detecting anomalous system behavior due to an ever increasing search space of system features and the challenges caused by the law of large numbers central limit theorem in detecting anomalies amongst large data sets. The law of large numbers in statistics states that as the number of identically distributed randomly generated variables increases, their sample mean approaches their theoretical mean. The central limit theorem states that for any population with a finite mean and standard deviation, the sampling distribution of the sample mean is approximately normal if the sample size is sufficiently large.

Especially difficult to detect anomalies are introduced by so-called advanced persistent threats, which may be found by minute variations in system behavior which only the most sensitive of detection schemes will identify. Finally, while detecting hidden anomalies in system behaviors and processes is paramount to detecting threat, so too is the need to reduce false positive detections which undermine the integrity of the detection capability.

Previous attempts at anomaly detection have focused on the deterministic or probabilistic nature of systems, however both of these approaches suffer from either too broad or too narrow a scope, such that critical anomalies are missed, or too many false positives are identified.

These and other drawbacks exist.

SUMMARY OF THE INVENTION

According to an embodiment of the present invention, a system implements model-based event-driven anomalous behavior detection. The system comprises: a memory component that stores data relating to training models and behavior detection; and a computer server coupled to the memory, the computer server comprising a programmed computer processor configured to: perform a training action that generates an expected behavior model that further comprises the steps of: generating a baseline for anomaly detection responsive to a plurality of statistical classifiers; generating a plurality of behavioral classifiers to create a separation between normal behavior and abnormal behavior by subdividing features into sets of data with statistical characterizations; and generating a collection of trained models of expected system probabilistic behavior for each event type and feature set of data sources; and perform anomalous behavior detection based on the collection of trained models.

According to yet another embodiment of the present invention, a method implements model-based event-driven anomalous behavior detection. The method comprises the steps of: performing a training action that generates an expected behavior model that further comprises the steps of: generating a baseline for anomaly detection responsive to a plurality of statistical classifiers; generating a plurality of behavioral classifiers to create a separation between normal behavior and abnormal behavior by subdividing features into sets of data with statistical characterizations; and generating a collection of trained models of expected system probabilistic behavior for each event type and feature set of data sources; and performing anomalous behavior detection based on the collection of trained models.

An embodiment of the present invention is directed to an optimal event-driven anomaly detection scheme. The present invention recognizes that anomaly detection based solely on rules-based (deterministic) or probabilistic analysis alone are insufficient to capture and respond to ever evolving, highly sophisticated threats that tend to persist within a system undetected for long periods of time. Each of these schemes alone is subject to a high number of false positive detections due to their inability to understand the overall behavioral aspects of a system. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
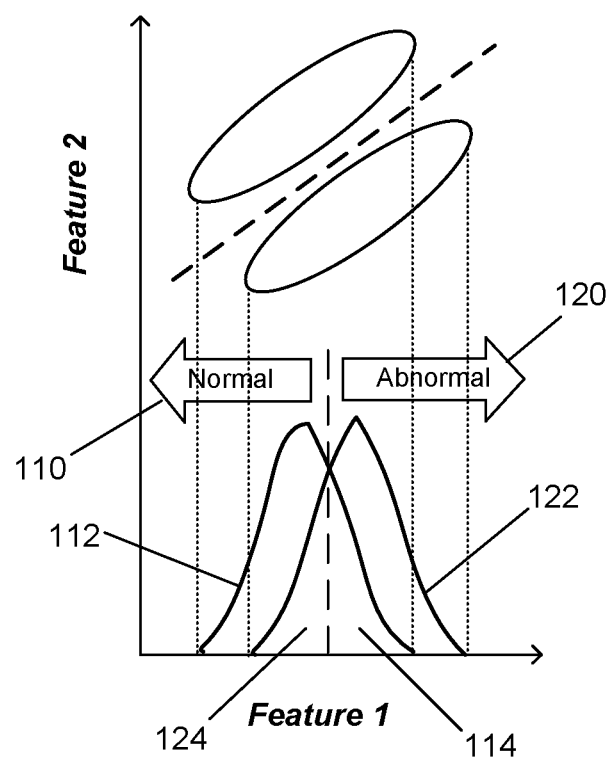
FIG. 1 is an exemplary illustration of improving separability of normal and abnormal behavior, according to an embodiment of the present invention.

FIG. 1 is an exemplary illustration of improving separability of normal and abnormal behavior, according to an embodiment of the present invention. FIG. 1 illustrates the concept of improving "separability" between the boundaries of normal behavior (represented by 110) and abnormal behavior (represented by 120) to optimize a balance of missed detections and false alarms. Missed detections may be illustrated by 122, 124 and false alarms may be illustrated by 112, 114. An embodiment of the present invention recognizes that adding data sources and/or features with distinguishing information improves separability. According to an embodiment of the present invention, a tiered detection scheme composed of behavioral analysis and machine-learned probabilistic system behaviors provides an optimal level of sensitivity to detect and respond to threats, and further limits the number of false positives identified. In essence, rules-based behavioral models provide context to raw statistical analysis which in turn enables a more rapid and accurate response than either solution alone. Furthermore, due to the broadly applicable nature of this innovative solution, any sized computer system that can be characterized by both deterministic and probabilistic behaviors may be monitored for anomalies through this approach.

A Model Based System Engineering (MBSE) approach to system development prescribes a method where a system may be behaviorally modeled and then implemented to match this model. For example, a system may be behaviorally modeled first at a system mission thread level, then broken out into system activities, and then finally into individual behaviors of which those activities are composed. An alternative to this approach for systems that have already been developed in the absence of a pre-defined system model may involve developing such a model ex-post-facto based on documented system requirements in order to model system behaviors. Regardless of when a system model is created, once available, a process and concomitant set of technologies may be applied whereby this model may be used as the basis for system analysis in various testing and operational environments. This analysis process may itself be broken down into separate components, namely event reconstruction (sometimes called complex event processing) and behavioral analysis, for example.

In event reconstruction, the logs and messaging that are output from a system may be first collected and then inspected (sometimes called deep-packet or deep-message inspection) and aggregated using developed software algorithms to create individual "events." Each event may represent an occurrence of a particular set of actions and some related system contextual state in a particular span of time. Furthermore, the messaging and any extra data logging that constitute an event's data may be required to occur exactly as expected in a deterministic model (in terms of message content and message sequence, for example). Events may span any amount of time, from a few milliseconds to a few hours or longer, depending on the system actions that each event represents, although smaller events may be preferred as this forms the basis of the event-driven anomaly detection. Behavioral analysis, on the other hand, refers to the process of taking each event and determining if the event occurred correctly relative to some expected system behavior. As the lowest level of the MBSE approach to system documenting and development is the behaviors of which the system activities and ultimately system threads are composed, these behaviors offer the level of detail required to determine if an event produced by the process of event reconstruction has occurred correctly, where correctness is based on a detailed understanding of how a system is intended to perform certain actions.

Following the reconstruction of events, an embodiment of the present invention produces a timeline of the events that have taken place in the system as well as a determination as to whether or not each event has occurred correctly and, if not, what has caused the system to misbehave. From the former is produced the "system behavioral context" that may be the foundation of the event-based anomaly detection. Therefore, when ascribing system behavioral context to anomaly detection, this may refer to understanding and identifying the unique system context and/or threads in which the system is operating at any given time, and breaking down and understanding the probabilistic system processes relative to these system threads as opposed to holistically and in the absence of the knowledge of system context.

Figure 2:
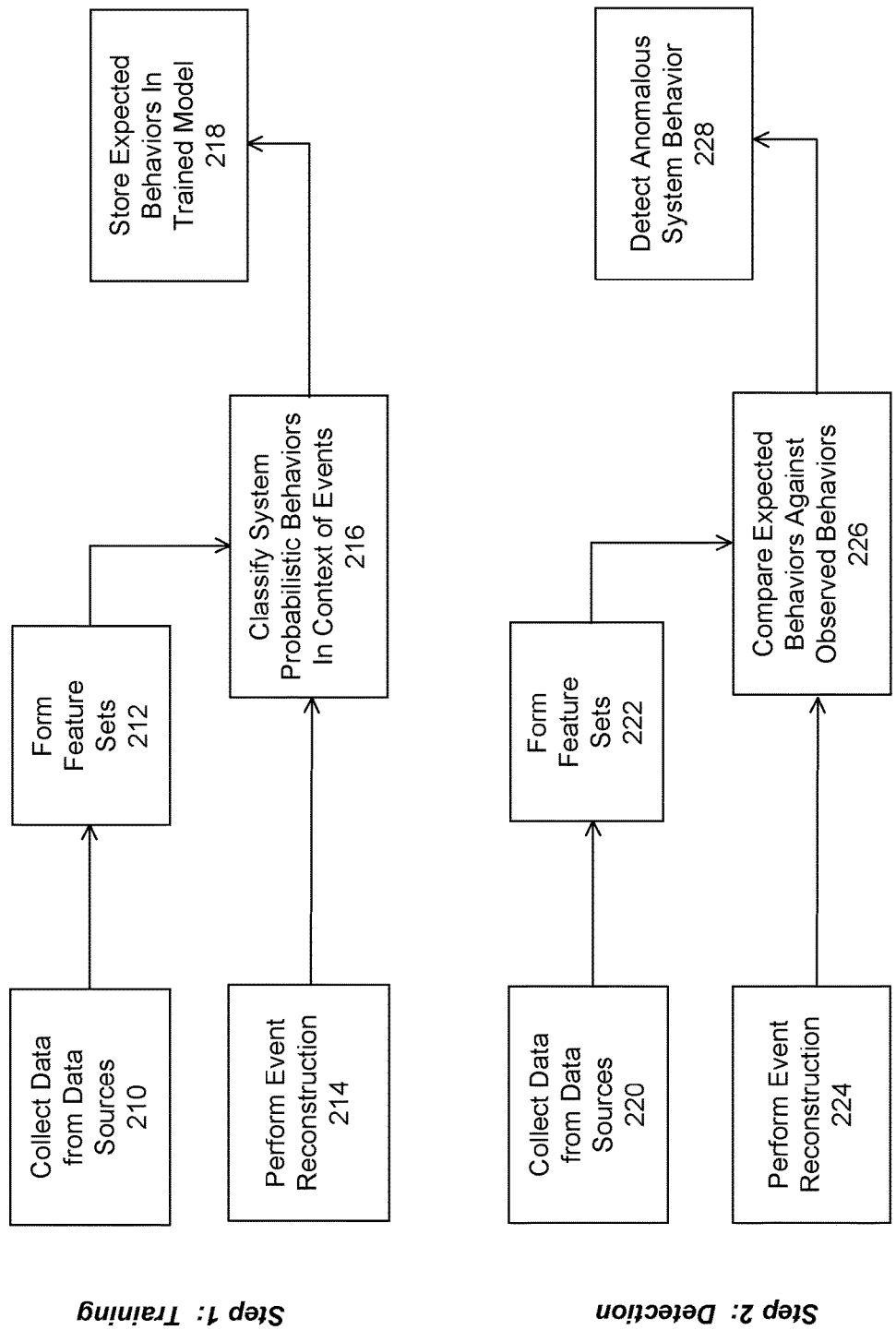
FIG. 2 represents a method in functional breakdown of steps, according to an embodiment of the present invention.

FIG. 2 represents a method in functional breakdown of steps, according to an embodiment of the present invention. FIG. 2 illustrates a training step and a detection step. In the training step, data may be collected from data sources, as shown by step 210. At step 212, feature sets may be foamed. At step 214, event reconstruction may be performed. At step 216, system probabilistic behaviors may be classified in the context of events. At step 218, expected behaviors may be stored in a trained model.

For the detection step, data may be collected from data sources, as shown by step 220. At step 222, feature sets may be formed. At step 224, event reconstruction may be performed. At step 226, expected behaviors may be compared against observed behaviors. At step 228, anomalous system behavior may be detected. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

The method and system for model-based event-driven system anomaly detection is described below.

Figure 3:
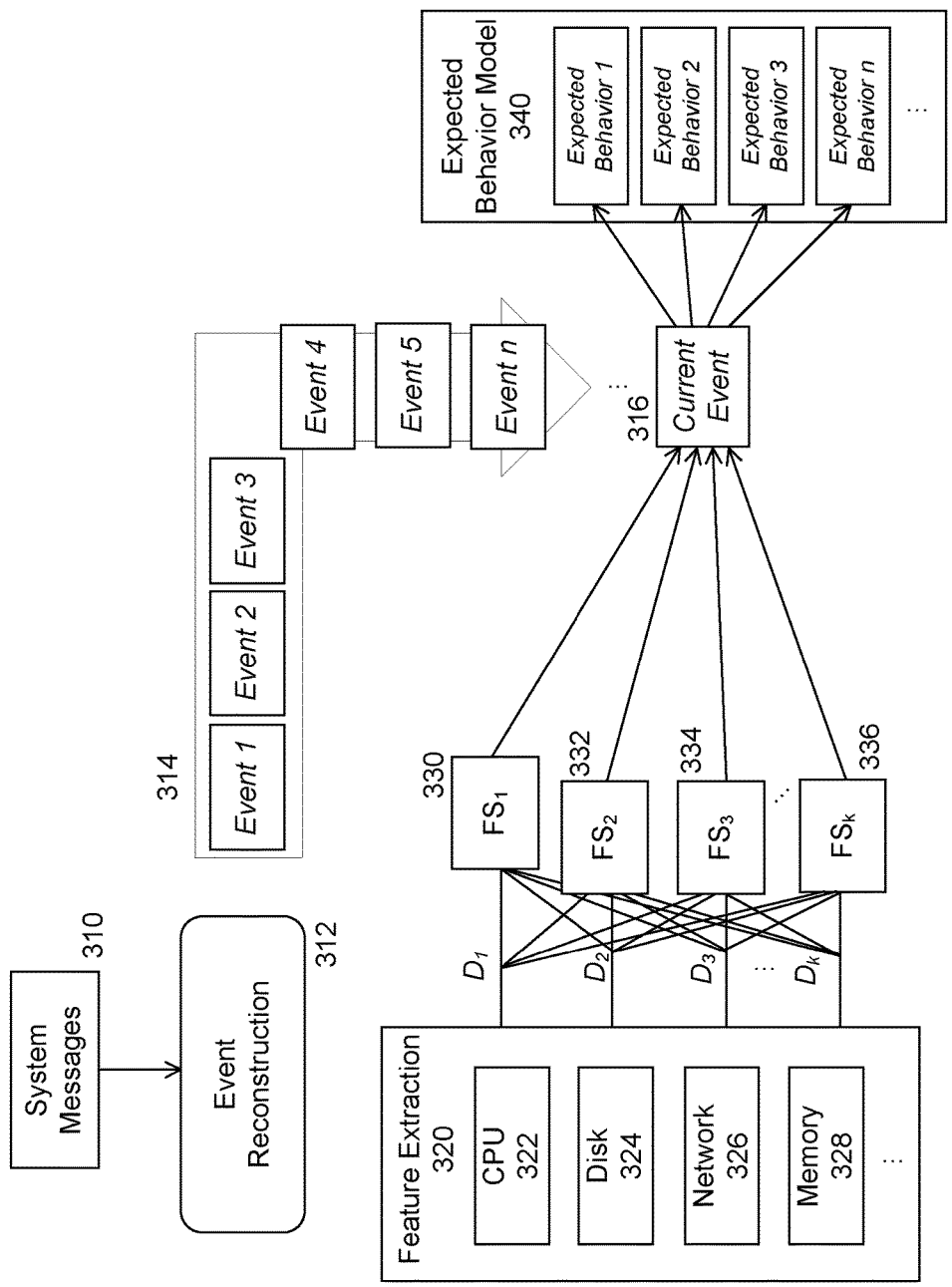
FIG. 3 represents a Training Step (Step 1) that illustrates expected behavior model generation, according to an embodiment of the present invention.

FIG. 3 represents a Training Step (Step 1) that illustrates Expected Behavior Model Generation, according to an embodiment of the present invention. For each feature in a system that may be used to identify anomalous system behavior, statistical classifiers may be used to establish a baseline for anomaly detection. Then, behavioral classifiers may be used to add an extra dimension to the data to create a better separation between normal and abnormal behavior by subdividing the features into smaller sets of data whose statistical characterizations (e.g., mean, standard deviation, median, and inter-quartile ranges) are more accurate than those of the system as a whole. The result may include a collection of trained models of expected system probabilistic behavior for each event type and feature set of unique system data sources.

As shown in FIG. 3, system messages 310 may be used for Even Reconstruction 312. A stream of N distinct system events may be illustrated at 314. Feature Extraction 320 may include CPU 320, Disk 324, Network 326 and Memory 328. FIG. 3 is merely illustrative, other components may be implemented. $D_1$ to $D_K$ may represent data from K different datasources. $FS_1$ to $FS_K$ (represented by 330-336) may represent feature fusion of m datasource subsets. Feature fusion refers to combining a plurality of features to obtain a single feature. Current Event 316 may be used to determine an Expected Behavior Model 340, which may include a set of Expected Behaviors.

According to an embodiment of the present invention, a system may be defined by various events. For example, in an example of an aircraft system, there may be a series of events and associated expected behaviors for performing various actions, including landing the aircraft, for example. The series of events may include a sequence of command messages and acknowledgements. In the example of an aircraft, events may include initiating landing gear deployment, deploying landing gear, receiving feedback from sensors, calculating tire pressure, etc. An embodiment of the present invention may further evaluate system metrics, including network traffic, CPU utilization and memory in context of the events. Each event may have different measures of system metrics.

An embodiment of the present invention recognizes that a system may perform various types of events. Events may include user initiated events (e.g., a pilot pushes a button) and continuous/ongoing events (e.g., system activity) that may require continuous monitoring of system metrics. An embodiment of the present invention may apply a feature fusion process where events may be combined and/or merged. For example, an embodiment of the present invention may recognize that for a particular event, a measure of system characteristics or performance may be captured. This may include combining system metrics to characterize an event, e.g., a number of messages sent on network; CPU utilization; memory utilization. For example, other events may have low network traffic and high memory utilization. By fusing together relevant system characteristics with an expected behavior, an embodiment of the present invention may accurately evaluate how a system performs against the historical norm.

Figure 4:
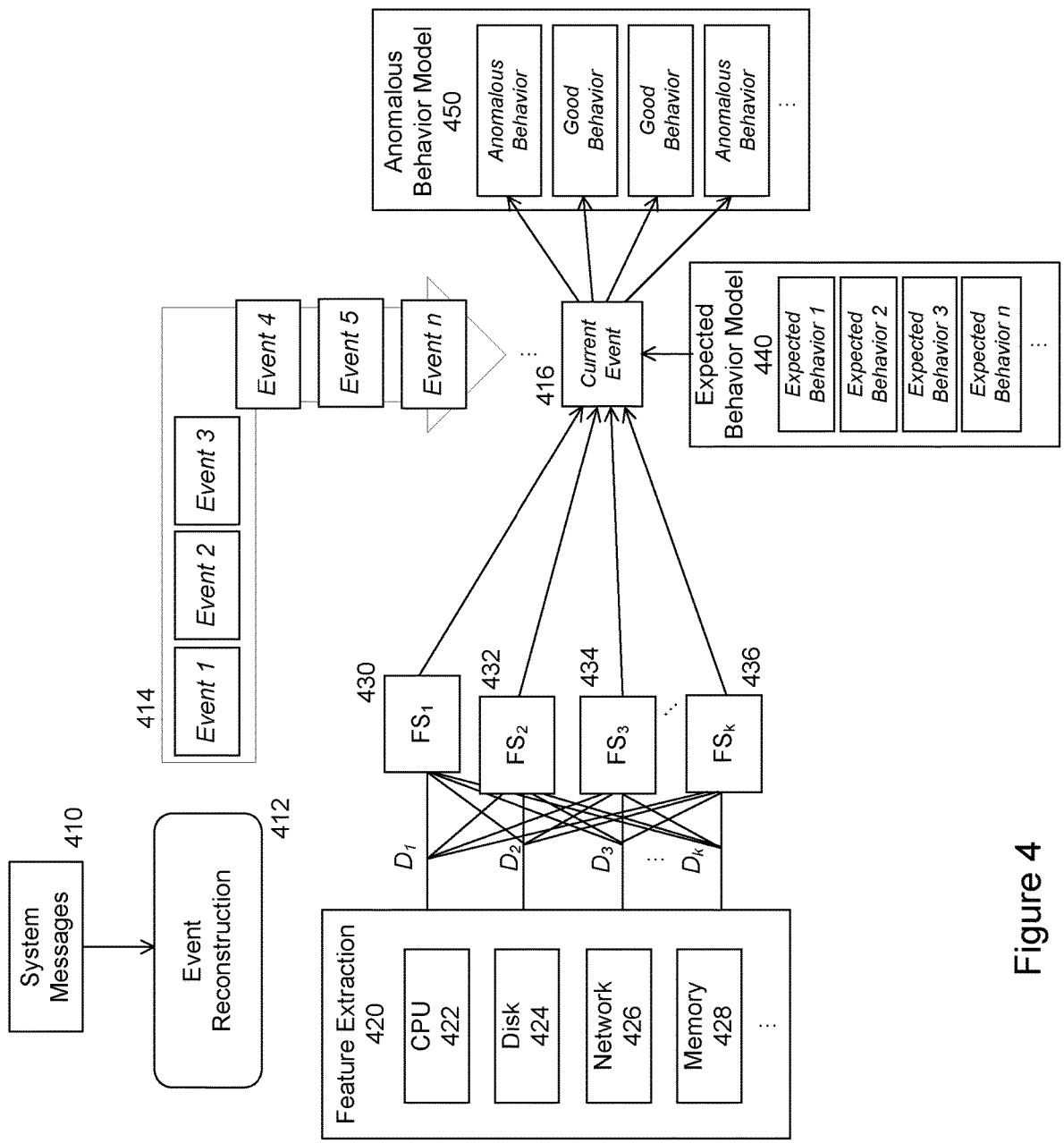
FIG. 4 represents a Detection Step (Step 2) that illustrates anomalous behavior detection, according to an embodiment of the present invention.

FIG. 4 represents a Detection Step (Step 2) that illustrates Anomalous Behavior Detection, according to an embodiment of the present invention. Detection may begin in a live/operational computer system wherein event reconstruction may be performed in real time to first break a system's operational timeline down into a discrete set of events.

As shown in FIG. 4, system messages 410 may be used for Even Reconstruction 412. A stream of N distinct system events may be illustrated at 414. Feature Extraction 420 may include CPU 420, Disk 424, Network 426 and Memory 428. FIG. 4 is merely illustrative, other components may be implemented. $D_1$ to $D_K$ may represent data from K different datasources. $FS_1$ to $FS_K$ 430-436 may represent feature fusion of m datasource subsets. Current Event 416 may receive inputs from Expected Behavior Model 440 and may further be used to detect anomalous behavior as shown by 450.

Figure 5:
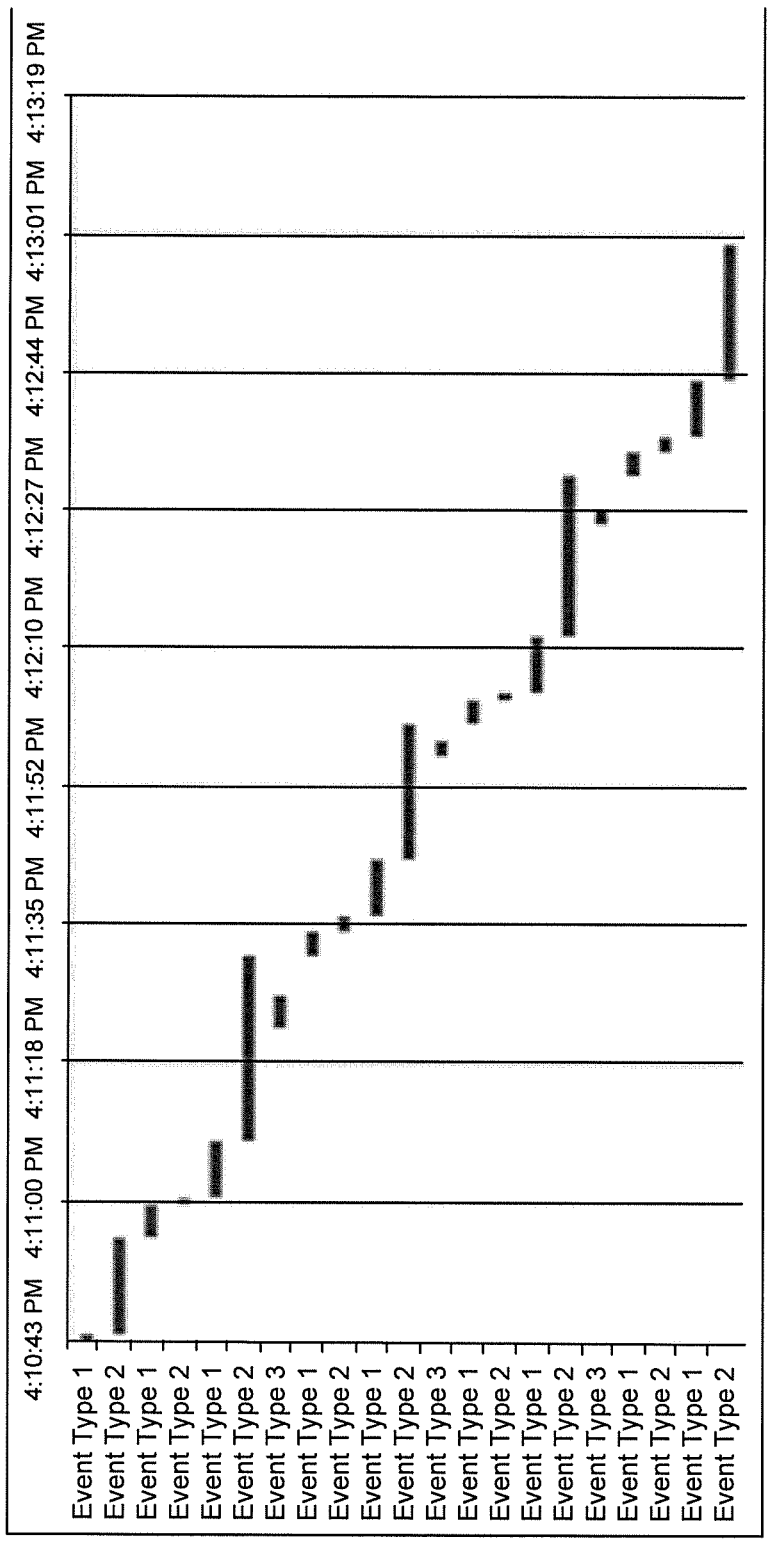
FIG. 5 illustrates a system event timeline, according to an embodiment of the present invention.

FIG. 5 illustrates a system event timeline, according to an embodiment of the present invention. FIG. 5 represents a breakdown of system operation in terms of individual events. Then, for each event, system features may be analyzed by the statistical classifiers and associated model created for the specific event type at training time (step 1), and a determination may be made as to whether or not feature values are representative of normal or abnormal system behaviors.

An example of how this process works should further serve to elucidate the innovative method described herein.

Figure 6:
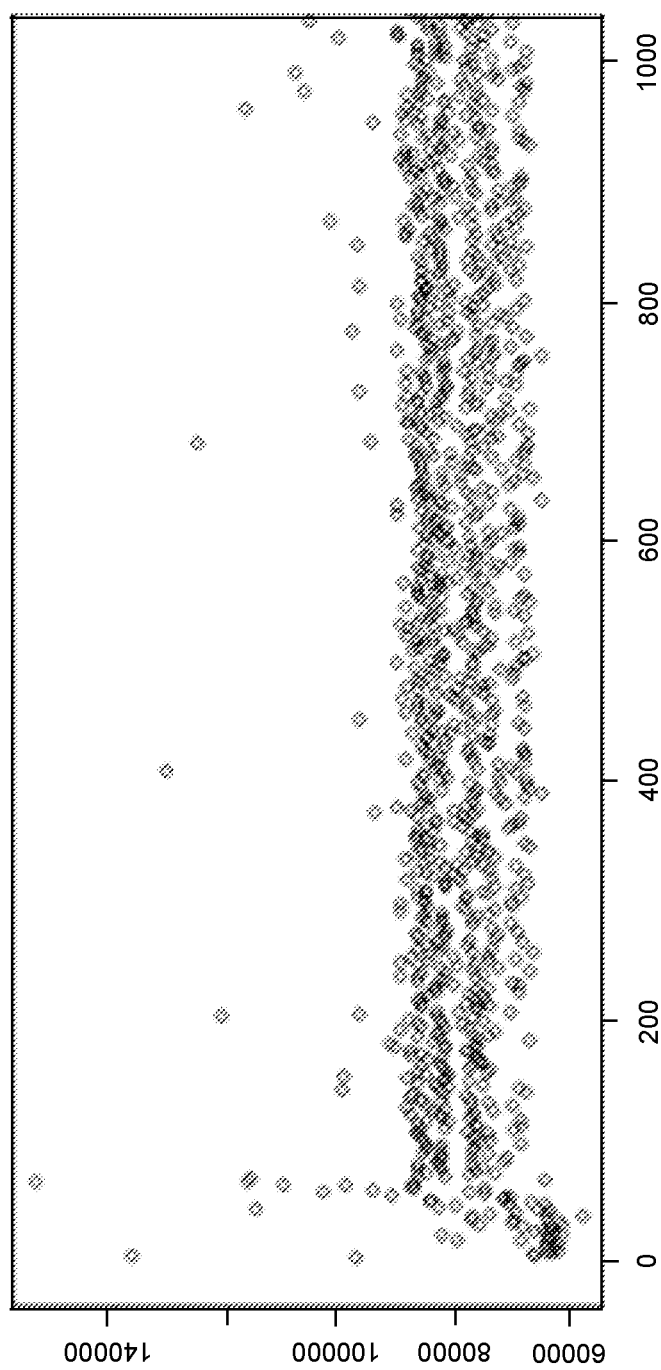
FIG. 6 illustrates system process network usage over time normal operation, according to an embodiment of the present invention.

FIG. 6 illustrates system process network usage over time normal operation, according to an embodiment of the present invention. FIG. 6 represents a plot of network usage of system processes over the course of one hour in a system dataset with no known statistical or behavioral anomalies. In this plot, each circle represents a single data point, and can be thought of as a time-indicator (e.g., at index 100 on the x-axis, the network usage was value y, where y corresponds to the value on the y-axis).

Figure 7:
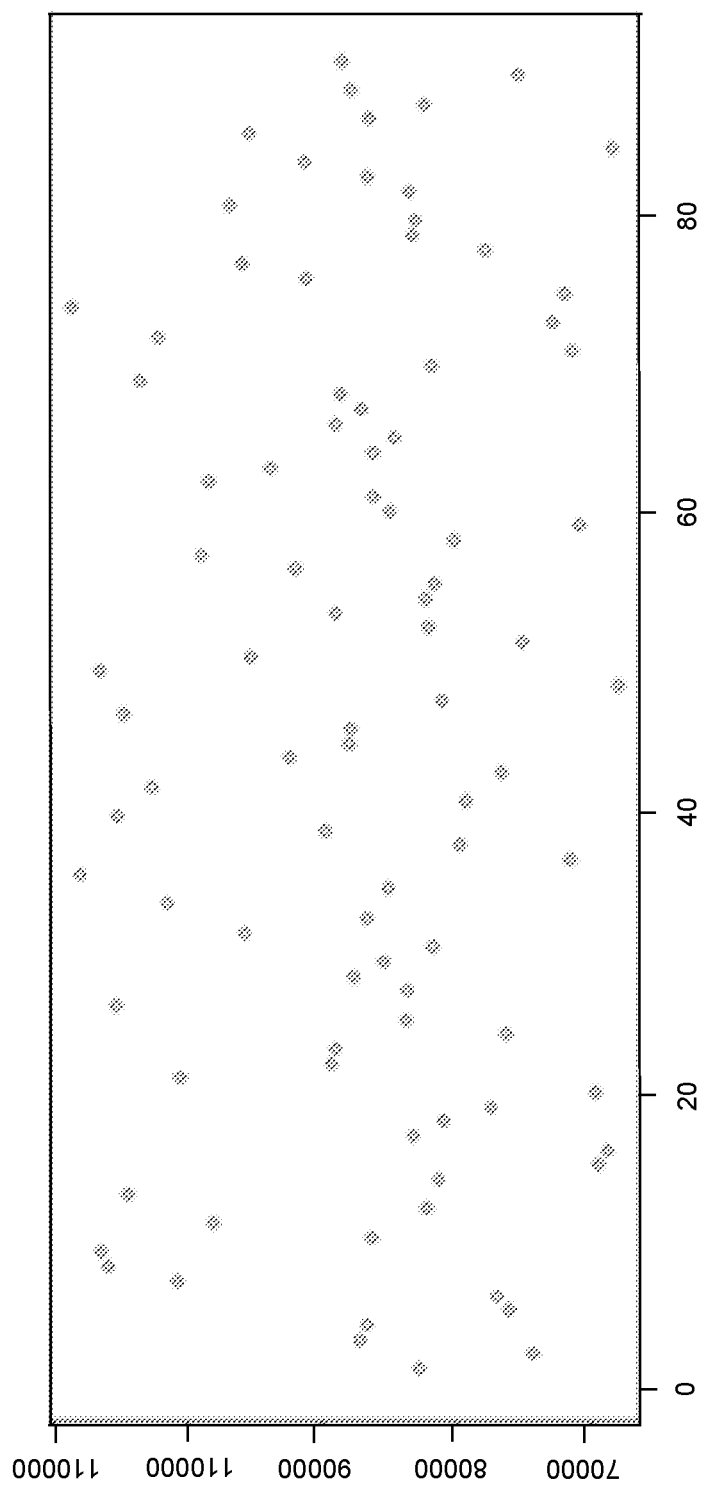
FIG. 7 illustrates an exemplary event type process network usage over time normal operation, according to an embodiment of the present invention.

Next, the event timeline shown in FIG. 5 is overlaid on top of the raw network usage network data in order to create the plot in FIG. 7, which shows the same feature set in FIG. 6 above, but only while Event Type 3 was occurring within the system. In other words, FIG. 7 is a subset of the data in FIG. 6.

FIG. 7 illustrates an exemplary event type process network usage over time normal operation, according to an embodiment of the present invention. This process may be completed for each event type, the example contained herein is shown for a single event type for the purposes of showing how the process works from start to finish for a single event type and feature set.

Figure 8:
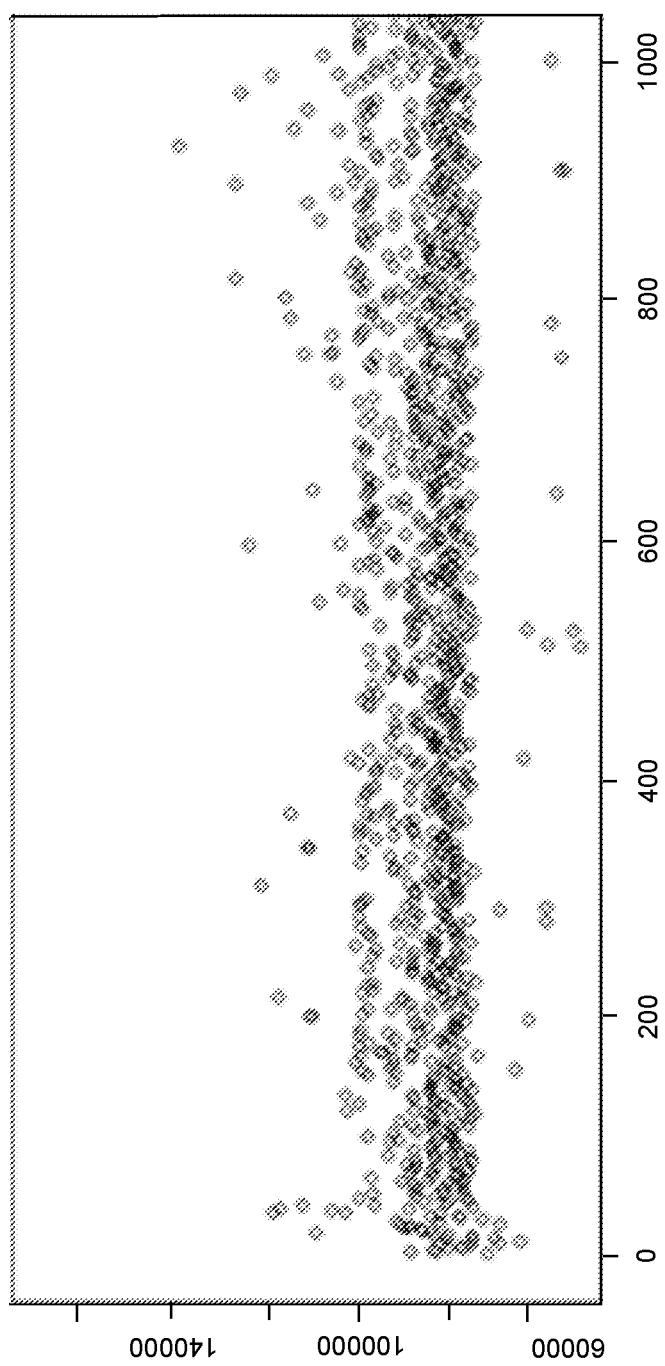
FIG. 8 illustrates a system process network usage over time abnormal operation, according to an embodiment of the present invention.

Finally, for the purposes of method illustration, a collection of data is shown in FIG. 8 in which anomalous network data is injected throughout system operation. This anomalous network data may be representative of the type of network usage which might be employed by malicious code that has managed to infiltrate and execute within a system or network. This graph corresponds to the same whole-system view of data as in FIG. 6, in so far as it is not yet filtered by event type (as is the case in FIG. 7).

FIG. 8 illustrates a system process network usage over time abnormal operation, according to an embodiment of the present invention. To complete the example, FIG. 8 (which contains some degree of atypical system operation) may be compared against FIG. 6 (which is representative of normal system operation).

Figure 9A:
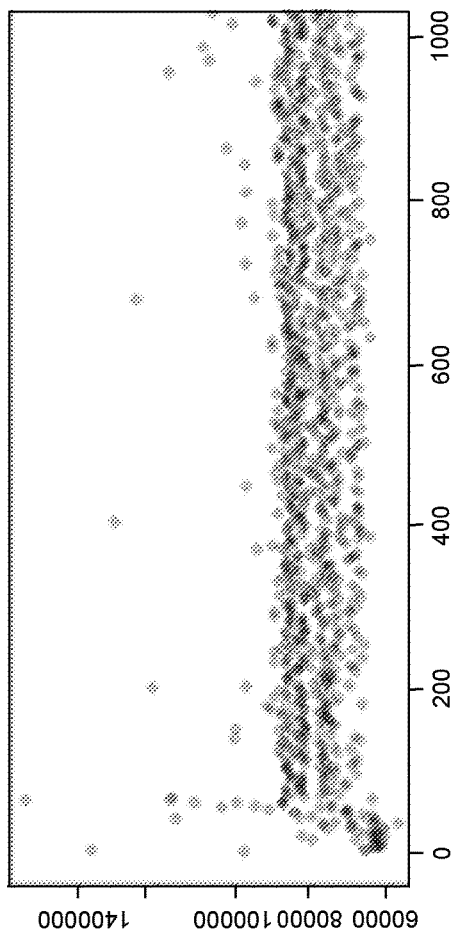
FIGS. 9A and 9B illustrate a side-by-side comparison of normal system operational data against abnormal system operational data without event context, according to an embodiment of the present invention.
Figure 9B:
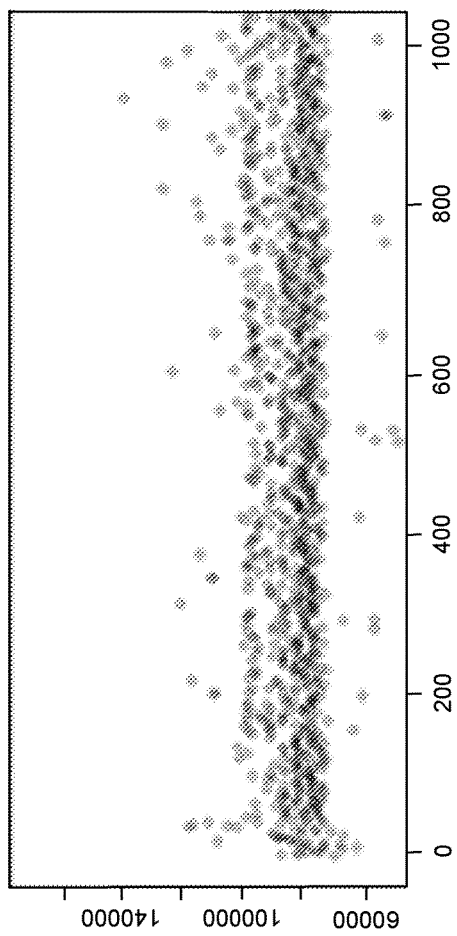

FIGS. 9A and 9B illustrate a side by side comparison of normal system operational data against abnormal system operational data without event context, according to an embodiment of the present invention. FIG. 9 illustrates a comparison with FIG. 6 on the left (FIG. 9A) and FIG. 8 on the right (FIG. 9B). As shown, there are no immediate visible and/or statistical indications of abnormal system operation.

Figure 10:
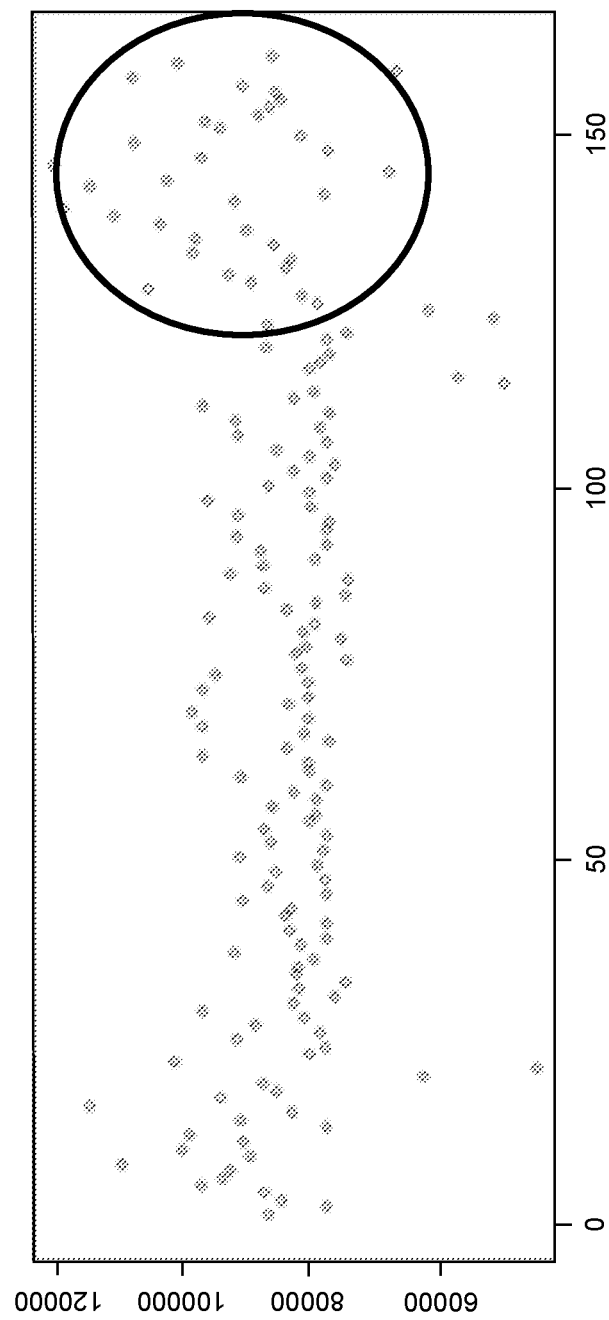
FIG. 10 illustrates an exemplary event type process network usage over time abnormal operation, according to an embodiment of the present invention.

FIG. 10 illustrates an exemplary event type process network usage over time abnormal operation, according to an embodiment of the present invention. However, FIG. 10 represents the same plot of system process network usage as shown above in FIG. 8, only this time filtered by Event Type 3 (the same as was done in FIG. 7 showing Event Type 3 during normal system operation).

Figure 11A:
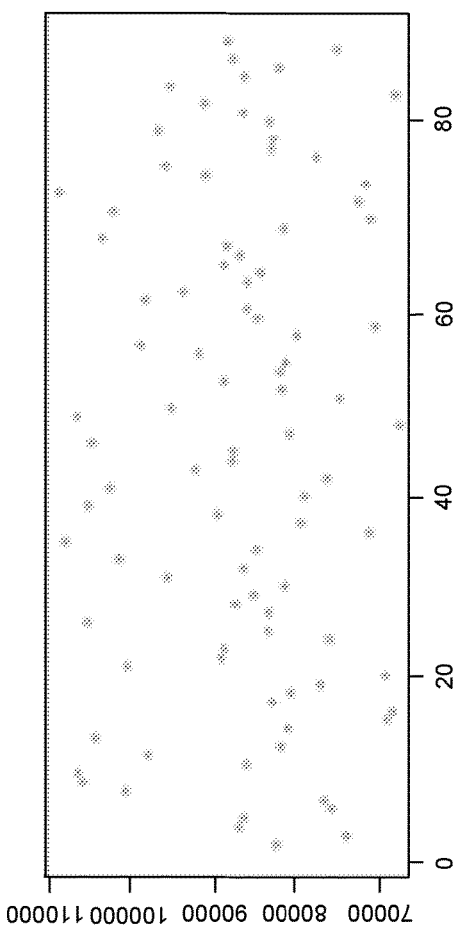
FIGS. 11A and 11B illustrate a side-by-side comparison of normal system operational data against abnormal system operational data with event context, according to an embodiment of the present invention.
Figure 11B:
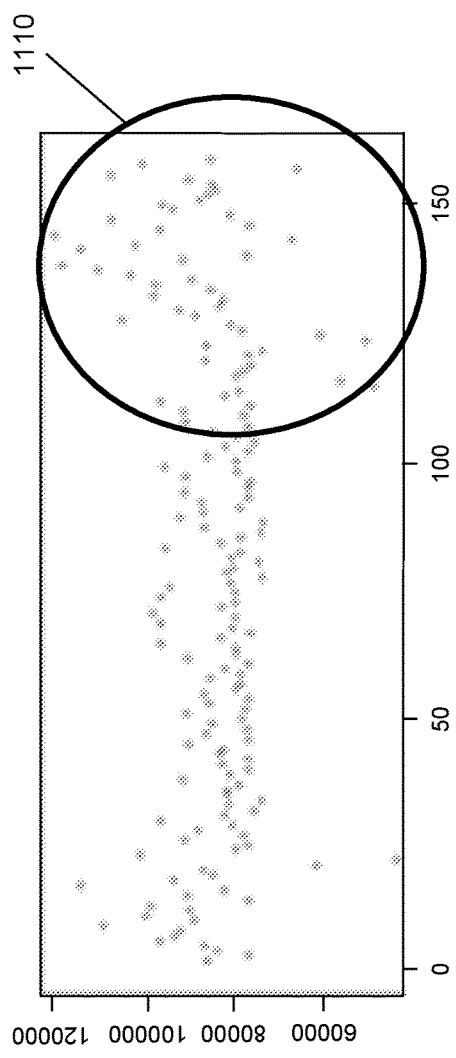

FIGS. 11A and 11B illustrate a side by side comparison of normal system operational data against abnormal system operational data with event context, according to an embodiment of the present invention. In comparing FIG. 10 to FIG. 7, (shown in FIGS. 11A and B with FIG. 7 on the left (FIG. 11A) and FIG. 10 on the right (FIG. 11B)) it can be seen that there is a pattern representing anomalous process network usage, as shown by 1110. However, if the same data is compared without event context, it is likely that this anomalous pattern would not have been identified as a system anomaly. Hence, by applying model-based event-driven anomaly detection to system statistical data analysis, an embodiment of the present invention may identify anomalies that would be otherwise undetectable.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements model-based event-driven anomalous behavior detection, the system comprising:
   a memory component that stores data relating to training models and behavior detection; and
   a computer server coupled to the memory, the computer server comprising a programmed computer processor configured to:
   perform a training action that generates an expected behavior model that further comprises the steps of:
      generating a baseline for anomaly detection responsive to a plurality of statistical classifiers;
      generating a plurality of behavioral classifiers to create a separation between normal behavior and abnormal behavior by subdividing features into sets of data with statistical characterizations; and
      generating a collection of trained models of expected system probabilistic behavior for each event type and feature set of data sources; and
   perform anomalous behavior detection based on the collection of trained models, that further comprises the steps of:
      reconstructing a stream of events in real-time based on one or more system messages;
      extracting feature data relating to system operation representing at least CPU, network and memory;
      identifying a current event, wherein the current event represents an occurrence of a set of actions and related system contextual state in a set span of time, the related system contextual state is based on the expected system behavior model;
      responsive to the stream of events and extracted feature data, generating a system event timeline that represents a breakdown of system operation in terms of individual events; and
      based at least in part on the system event timeline, determining whether the current event is considered an expected behavior or an anomalous behavior.

2. The system of claim 1, wherein the statistical characterizations comprise mean, standard deviation, median and inter-quartile ranges.

3. The system of claim 1, wherein the set of data sources comprise CPU, disk, network and memory components.

4. The system of claim 1, wherein each system feature is analyzed by a corresponding statistical classifier and associated model.

5. The system of claim 4, wherein a determination is made as to whether or not a feature value is representative if normal behavior or abnormal system behavior.

6. The system of claim 1, wherein the system event timeline represents network usage of system processes over time.

7. The system of claim 1, wherein the event type represents a collection of events, each event representing an occurrence of a particular set of actions and a related system contextual state in a particular span of time.

8. The system of claim 1, wherein subdividing features into sets of data further comprises applying feature fusion process.

9. A method that implements model-based event-driven anomalous behavior detection, the method comprising the steps of:
   performing a training action that generates an expected behavior model that further comprises the steps of:
      generating a baseline for anomaly detection responsive to a plurality of statistical classifiers;
      generating a plurality of behavioral classifiers to create a separation between normal behavior and abnormal behavior by subdividing features into sets of data with statistical characterizations; and
      generating a collection of trained models of expected system probabilistic behavior for each event type and feature set of data sources; and
   performing anomalous behavior detection based on the collection of trained models, that further comprises the steps of:
      reconstructing a stream of events in real-time based on one or more system messages;
      extracting feature data relating to system operation representing at least CPU, network and memory;
      identifying a current event, wherein the current event represents an occurrence of a set of actions and related system contextual state in a set span of time, the related system contextual state is based on the expected system behavior model;
      responsive to the stream of events and extracted feature data, generating a system event timeline that represents a breakdown of system operation in terms of individual events; and
      based at least in part on the system event timeline, determining whether the current event is considered an expected behavior or an anomalous behavior.

10. The method of claim 9, wherein the statistical characterizations comprise mean, standard deviation, median and inter-quartile ranges.

11. The method of claim 9, wherein the set of data sources comprise CPU, disk, network and memory components.

12. The method of claim 9, wherein each system feature is analyzed by a corresponding statistical classifier and associated model.

13. The method of claim 12, wherein a determination is made as to whether or not a feature value is representative if normal behavior or abnormal system behavior.

14. The method of claim 9, wherein the system event timeline represents network usage of system processes over time.

15. The method of claim 9, wherein the event type represents a collection of events, each event representing an occurrence of a particular set of actions and a related system contextual state in a particular span of time.

16. The method of claim 9, wherein subdividing features into sets of data further comprises applying feature fusion process.

* * * * *